Nov. 12, 1968 F. D. MAHONEY 3,410,520
BUTTERFLY VALVE WITH FLUID ACTUATED SEAL
Filed Sept. 22, 1965 2 Sheets-Sheet 1
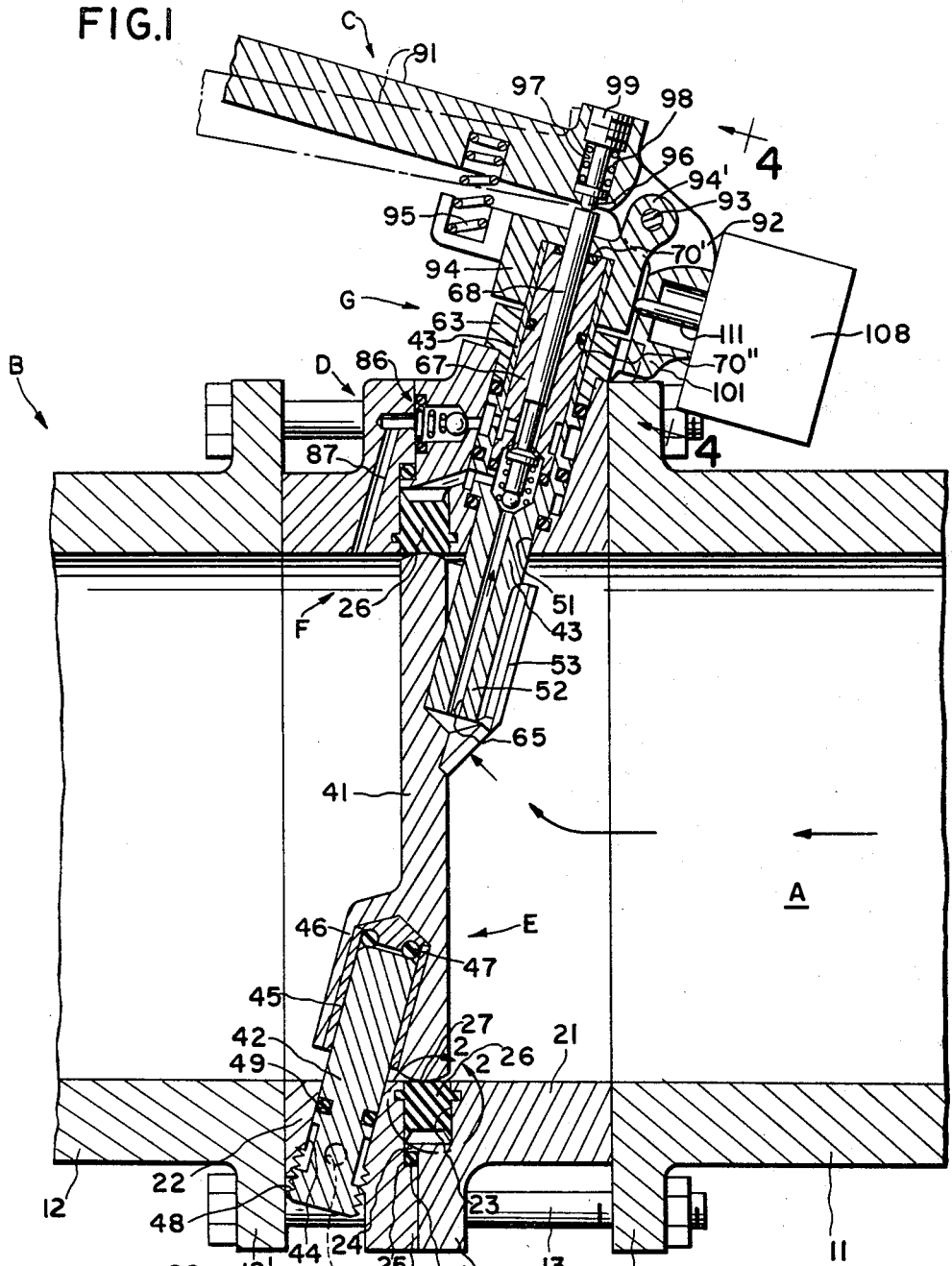
INVENTOR.
FRANK D. MAHONEY
BY Townsend and Townsend
ATTORNEYS Nov. 12, 1968    F. D. MAHONEY    3,410,520
BUTTERFLY VALVE WITH FLUID ACTUATED SEAL
Filed Sept. 22, 1965    2 Sheets-Sheet 2
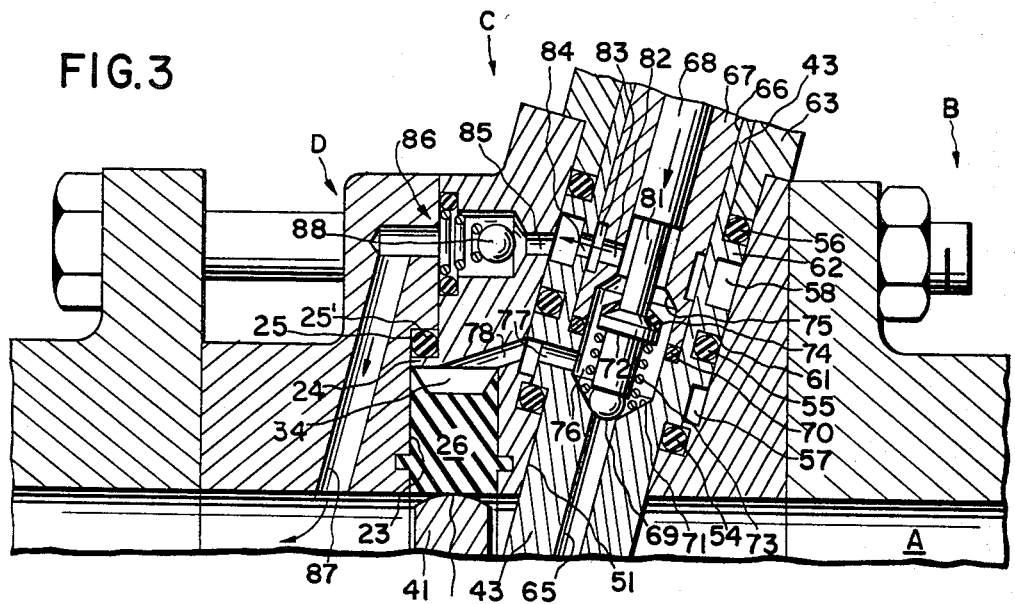
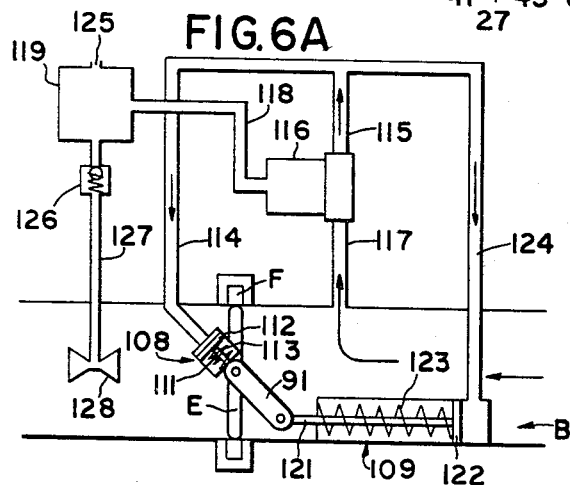
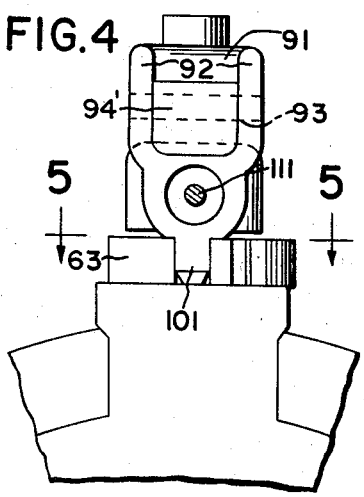
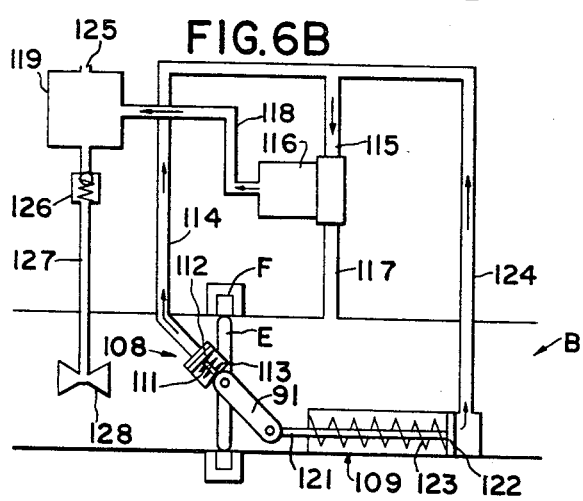
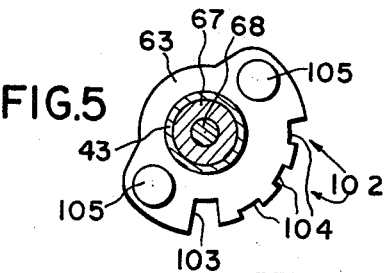
INVENTOR.
FRANK D. MAHONEY
BY Townsend and Townsend
ATTORNEYS

3,410,520
BUTTERFLY VALVE WITH FLUID ACTUATED SEAL
Frank D. Mahoney, 68 Mulberry Lane, Atherton, Calif. 94025
Filed Sept. 22, 1965, Ser. No. 489,160
4 Claims. (Cl. 251—173)

ABSTRACT OF THE DISCLOSURE

A butterfly valve is disclosed wherein an annular sealing member is mounted in the fluid passage and sealing engagement between the seating member and valve member is accomplished using fluid from the stream being controlled and applied against the outside surface of the sealing member. The valve member itself is turned by means of fluid from the fluid line being controlled.

---

The present invention relates in general to butterfly valves and more particularly to a butterfly valve which is operated by fluid in the passage being controlled and from the fluid stream and directed against the sealing member.

One of the primary problems with butterfly valves which are located in a fluid stream is the establishment between the valve periphery and the valve housing of a seal that is fluid tight when the valve is closed and yet permits reasonably easy movement of the valve from closed to open position. Various attempts to solve this problem have been unsuccessful for one reason or another. For example, U.S. Patent Re. No. 23,613 to Danks discloses an inflated sealing member which resiliently engages the periphery of the butterfly valve member upon closing. However, the intimate contact between the sealing member and the valve member resists movement of valve member both on closing and on opening with resultant wear. U.S. Patent No. 2,673,708 to Danks includes provision for providing access from the upstream side of the valve member to the sealing member whereby upon closure of the valve member pressure from the fluid upstream of the valve member causes the sealing member to more intimately contact the periphery of the valve member. However, this increased intimate contact between the sealing member and the periphery of the valve member must be overcome when the valve is opened with the result that the valve is difficult to operate and the sealing member short lived.

Similarly, U.S. Pat. No. 2,911,184 to Moore discloses the use of a sealing member covering an annular sealing chamber that is divided by a partition with ports on opposite sides of the partition communicating with opposite sides of the closed valve whereby fluid pressure from the upstream side of the valve is applied to the sealing member to maintain intimate contact between the sealing member and the periphery of the butterfly valve. Again, as in the Danks patents, no provision is made for relieving the pressure applied to the sealing member when it is desired to open the valve.

Broadly stated the present invention to be described in greater detail below is directed to a butterfly valve and the apparatus for sealing and controlling the valve wherein the valve member is positioned in a main fluid passage for movement between an open position wherein the flow of fluid past the member is permitted and a closed position wherein the valve divides the passage into an upstream chamber and a downstream chamber; a sealing member is located between the periphery of the valve member and the housing when the valve member is in closed position; and fluid passageways are provided for applying pressure to and relieving pressure from a portion of the sealing member other than the sealing surface of the sealing member. The fluid passageways include a first passageway providing communication between the upstream chamber and the said portion of the sealing member for directing fluid pressure against the sealing member to urge the sealing member into sealing position and a second fluid passageway for relieving pressure against the said portion of the sealing member during opening the valve.

With this construction pressure from the upstream side of the valve is applied to the sealing member, when closed, for maintaining intimate contact and a fluid tight seal between the sealing member and the butterfly valve member, and when desired this pressure is removed to permit easy opening of the valve. Obviously, this construction produces a minimum of wear between the valve and the sealing member since relative movement between the sealing member and the valve member takes place without pressure applied to form the seal.

In accordance with another aspect of the present invention a single valve actuating member is provided for controlling the pressure on the sealing member and the position of the valve member. This actuating member includes a valve stem located internally of a shaft section on which the valve member is mounted. A lever arm connected to the shaft section permits rotation of the shaft section for rotating the valve member as well as depression of the valve stem for controlling the pressure on the sealing member. With this construction the valve assembly can easily be operated with the one lever arm and facilitates remote control of the butterfly valve assembly.

In accordance with still another aspect of the present invention remote control of the butterfly valve assembly in accordance with the present invention is accomplished utilizing fluid from the fluid line being controlled and includes provision for a first fluid cylinder to depress the valve stem and a second fluid cylinder to rotate the valve member with the two fluid cylinders so constructed that in opening the valve pressure is removed from the sealing member before rotation of the valve member can be accomplished and in closing the valve rotation of the valve member is completed before pressure is applied to the sealing member.

Other objects and advantages of this invention will become apparent when reading the following description and referring to the accompanying drawings in which similar characters of reference represent corresponding parts in each of the several views.

In the drawings:

FIG. 1 is a longitudinal sectional elevation of one form of butterfly valve in accordance with the present invention positioned for sealing the valve member;

FIG. 2 is an enlarged view of the portion of the structure shown in FIG. 1 delineated by line 2—2;

FIG. 3 is an enlarged sectional view of a portion of the structure shown in FIG. 1 positioned for unsealing the valve member;

FIG. 4 is a cross sectional view of a portion of the structure shown in FIG. 1 taken along line 4—4 in the direction of the arrows;

FIG. 5 is a sectional view of a portion of the structure shown in FIG. 4 taken along line 5—5 in the direction of the arrows;

FIG. 6A is a schematic view illustrating operation of apparatus for opening the butterfly valve in accordance with one aspect of the present invention; and FIG. 6B is a schematic view similar to FIG. 5A illustrating operation of apparatus for closing the butterfly valve in accordance with one aspect of the present invention.

Referring now to the drawing with particular reference to FIGS. 1 and 2, there is shown a butterfly valve in accordance with the present invention provided in a fluid line for control of fluid. As illustrated, the flow of fluid through a passage A in a fluid line B is controlled by a butterfly valve assembly C which comprises a housing D, a butterfly valve member E mounted within the housing, a sealing member F for sealing the valve member to the housing when the valve member is in closed position and a control assembly G for controlling movement of the valve member and operation of the sealing member with fluid pressure from the fluid traveling through the passage A.

The fluid line B illustrated is made up of upstream and downstream tubular bodies 11 and 12 respectively which are secured together in a fluid-tight manner with the butterfly valve asembly C held therebetween such as by means of bolts 13 which engage exterior annular flange members 11' and 12' on the adjacent ends of the tubular bodies 11 and 12, respectively. Naturally, the assembly can be sealed using sealing gaskets, O-rings, sealing greases, etc., and the butterfly valve assembly can actually be formed integrally in a fluid line. However, for easy assembly and disassembly the valve assembly C is preferably formed as a separate unit which can be inserted and removed from the fluid line B.

The butterfly valve assembly C includes upstream and downstream short tubular housings 21 and 22 respectively which include radially extending annular flanges 21' and 22' respectively through which pass the bolts 13 holding the body members of the fluid line D. Housing 21 is provided with an outwardly extending step in its inside diameter so as to define with the adjacent end face of housing 22 an annular recess 23 for holding the sealing member F. The housing 21 includes an axially extending shoulder 24 which is utilized for centering and sealing the housings 21 and 22 together. This shoulder 24 defines a radially outwardly located recess 25 when the housings 21 and 22 are abutted against one another and an O-ring 25' located in this recess 25 seals the housings 21 and 22.

The sealing member F located in the annular recess 23 between the housings 21 and 22 comprises a sealing ring 26 of rubber, Teflon and the like which has an inwardly facing sealing surface 27 and axially extending ears 28 and 29 which are received in axially extending annular slots 31 and 32 in the housings 21 and 22, respectively. The sealing ring 26 is provided with a groove 33 in its radially outwardly facing surface defining a pressure chamber 34 in the radially outward portion of the annular recess 23. With this construction pressure can be applied to the chamber 34 in the manner to be described in greater detail below for forcing the sealing ring 26 inwardly to seal the surface 27 against the valve member. The axially extending ears 31 and 32 serve to retain the sealing ring in the recess 23 and seal the chamber on the upstream side of the valve from the chamber on the downstream side when the valve is in closed position.

The butterfly valve member F includes a disc shaped body 41 supported within the valve housing D by stationary and rotary aligned shaft sections 42 and 43, respectively. The stationary shaft section 42 passes through a bore 44 in the housing 22 and has its inner end rotatably positioned in a bearing sleeve 45 in a boss 46 on the body 41. This inner end of the stationary shaft section 42 is supported within the sleeve 45 by a pole bearing thrust 47 and the shaft section 42 is provided with means such as, for example, screw threads 48 on its outer end cooperating with threads in the bore 44 for adjusting the position of the valve member E within the fluid line A. An O-ring 49 located in an annular recess on the exterior surface of the shaft section 42 seals the shaft section 42 in the bore 44 and a set screw 50 is used to lock the section 42 in place.

The rotatable shaft section 43 which serves as a part of the control assembly C has a stepped outer diameter passing through a stepped diameter bore 51 in the housing 21 and has serrations at the exterior surface of its inner end 52 mating with serrations in a boss 53 on the disc body 41 so that rotation of the shaft section 43 causes rotation of the disc body 41. The shaft section 43 is sealed within the bore 51 such as, for example, by an O-ring seal 54 located at a step in the diameter of the shaft section.

Spaced from the O-ring 54 outwardly along the shaft 43 are two other O-rings, 55 and 56, respectively, so located as to define at the surface of shaft section 43 two annular chambers 57 and 58 which are sealed from one another. The inner chamber 57 is located between the O-rings 54 and 55 and the outer chamber 58 is located between the O-rings 55 and 56. The O-ring 55 is retained in an annular groove 61 in the exterior surface of the shaft 43, and the O-ring 56 is held against a step shoulder 62 on the exterior surface of the shaft 43 by a retaining ring 63 secured to the housing 21 such as, for example, by two cap screws 105.

A small diameter axial bore 65 passes from the inner end 52 of shaft section 43 to a region near the O-ring 54 where the axial bore is enlarged to a large diameter 66. A valve stem 68 is slidably located within this large diameter bore 66 inside a sleeve 67 which extends nearly to the region of the inner annular chamber 57 and is sealed within the bore 66 by an O-ring 70. The valve stem 68 is sealed within the sleeve 67 by an O-ring 70' locatetd at the exterior end of the sleeve 67 and the sleeve is sealed within the section 43 by an O-ring 70''. On the inner end of the valve stem 68 a valve face 69 is provided which cooperates with a valve seat 71 located at the adjacent end of the small diameter bore 65 for sealing the small diameter bore 65. A shoulder 72 is provided on the exterior surface of the valve stem 68 spaced from the valve face 69 and is engaged by one end of a compression coil spring 73 the other end of which is seated against the valve seat 71 to urge the valve stem upwardly in the sleeve 67. A seal such as, for example, a molded seating ring 74 is provided on the surface of the shoulder 72 axially outwardly from the surface against which the coil spring 73 bears for mating with a seat surface 75 for sealing one end of a chamber 76 extending from the seat 75 to the seat 71 and containing the end of the valve stem 68 including the valve face 69 and shoulder 72.

One or more radially extending passageways 77 provide communication between the chamber 76 and annular chamber 57, and another passageway 78 extends from the bore 51 to the radial outward portion of annular recess 23 and the chamber 34 located at the outer surface of the sealing ring 26.

The diameter of the valve stem 68 is reduced at 81 for a short distance outwardly from the shoulder 72 to permit fluid passing by the valve seat 75 to pass through radially outwardly extending passageways 82 in the sleeve 67. These passageways 82 communicate with an annular chamber in sleeve 67 which in turn communicates via radially outwardly extending passageways 84 in the shaft section 43 with the annular chamber 58. A short passageway 85 connects the annular chamber 58 with a check valve 86 thence through a passageway 87 to the fluid line downstream of the butterfly valve member E when in closed position. In the check valve 86 a sealing ball 88 is spring biased to prevent passage of fluid through passageway 87 from the downstream side of the valve member E.

In order to compress the sealing member against the periphery of the valve member E when the valve is initially closed the spring 83 biases the valve stem 68 outwardly to seal the ring 74 against the valve seat 75 and permit passage of fluid from the reduced diameter bore 65 on the upstream side of the valve member into chamber 76 and thence into chamber 34 against the sealing member 26. To relieve the pressure on the sealing member in order to open the valve the valve stem 68 is moved inwardly whereby the sealing ring 74 is unseated from seat 75 and valve face 69 is seated against valve seat 71 closing off communication from the upstream side of the valve member into chamber 76 and providing communication from chamber 34 to chamber 76 and thence to the downstream side of the valve member E via passage through 82, 83, 84, 58, 85, 86 and 87.

For movement of the valve stem 68 a lever arm 91 bifurcated at 92 is rotatably mounted by a pin 93 on a nose portion 94' of a cap 94 secured to the outer end of the shaft section 43. This lever arm 91 is spring biased in the outward position shown in FIG. 1 by means of a spring 95 located under compression between the lever arm 91 and cap 94. An actuating bearing member 96 which contacts the outer end of valve stem 68 is resiliently supported in a bore 97 in the arm 91 via spring 98 and threaded plug member 99. The coil spring 98 urging the bearing member 96 against the valve stem 68 is stronger than the coil spring 73 located in chamber 76 urging the valve stem outwardly so that upon actuation of the lever arm 91 rearwardly of the bifurcated portion 92 the valve stem 68 is actuated inwardly unless it is jammed for some reason or another in which case the spring 98 permits the bearing member 96 to yield.

The forward end of the lever arm beyond the bifurcated portion 92 is provided with an engaging finger 101 machined to engage valve position locating notches 102 provided in the exterior surface of the retaining ring 63. These notches 102 include a deep "closed position" notch 103 for locating the valve member E in closed position and a plurality of open position notches 104 for locating the valve member E in various open positions for passing desired amounts of fluid through the fluid line B. As shown in FIG. 5 the retaining ring 63 is locked in desired position by, for example, cap screws 105.

The lever 91 can be manually operated to control the butterfly valve or can be operated by remote control by use of a lever depressing mechanism such as the fluid cylinder 108 in FIG. 1 and illustrated schematically in FIGS. 6A and 6B and a lever rotating mechanism not shown in FIGS. 1–5 but illustrated schematically as a fluid cylinder 109 in FIGS. 6A and 6B.

Manual operation of the actuating lever arm 91 and the passage of fluid for sealing and unsealing the valve member E will be described with reference to FIGS. 1–4.

For closure of the valve member E to the position shown in FIG. 1 the lever arm 91 is rotated until the finger 101 contacts the stop adjacent the notch 103 in cap 63 and the lever arm is then released. Due to the action of spring 95 the lever arm 91 rotates from the position shown in phantom in FIG. 1 to the position shown in solid with the finger 101 entering and resting in the closed position notch 103. With the lever arm 91 in this position the valve stem 68 moves outwardly under the influence of spring 73 to the position illustrated in FIG. 1 with the ring 74 sealed against the valve seat 75 thereby preventing communication between the chamber 76 and the reduced diameter portion 81 of the valve stem 68. In this position of the valve stem 68 the sealing face 69 is unseated from valve seat 71 thereby permitting passage of fluid from fluid line A on the upstream side of valve E through small diameter bore 65 in shaft 43, into chamber 76 and through passageway 77, chamber 57, and pasageway 78 into chamber 34 for application of the upstream line pressure to the sealing ring 26 to create a fluid tight seal between the periphery of the valve member E and the sealing surface 27 of sealing member 26. This sealing structure has been found to be very effective in producing a leak tight seal in fluid lines. For example, butterfly valves constructed in accordance with the present invention have provided leakproof seals in fluid lines on the order 4 inches ID and fluid pressures on the order of 50 p.s.i. with sealing members having about 4¾ inches OD. Since the area around the circumference of the sealing member is greater than the ID of the fluid line and the ID of the sealing member the fluid stream pressure exerts a greater pressure on the outside of the sealing member than on the inside to produce a fluid tight seal.

To open the butterfly valve the pressure applied to the sealing ring 26 from chamber 34 is reduced so that the butterfly valve can be easily rotated to one or more of the various open positions. This is accomplished by depressing the lever arm 91 to the position shown in phantom in FIG. 1 whereby the locating finger 101 is removed from slot 103 for rotation to one of the open position locations indicated as 104. Upon depression of the lever 91 the valve stem 68 is moved inwardly so that its inner end assumes the position illustrated in FIG. 2. In this position the seal between the sealing ring 74 and the valve seat 75 is open and a seal is created between the valve face 69 and the valve seat 71. Thus, communiration between the upstream side of the valve member E and the chamber 76 is obstructed and the pressure in chamber 34 behind the sealing ring 26 is removed by communication from chamber 34 to the downstream side of the valve member via passage 78, chamber 57, passage 77, chamber 76, passage 82, chamber 83, passage 84, chamber 58, passage 85, check valve 86 and passage 87. With the pressure in chamber 34 reduced to the pressure on the downstream side of the valve member E the valve member E can easily be rotated by turning the lever arm 91 to the desired position 104.

The butterfly valve operating and sealing construction is designed for one lever operation which insures that the pressure is applied to the seal only after the butterfly valve is closed and is relieved from the seal before the butterfly valve is opened. This construction is readily adapted for remote control operation so that unattended valves spaced along the fluid line A can be operated on command and valve control cannot be affected by a stranger in the vicinity of the unattended valve.

In accordance with one aspect of the present invention remote control operation of the butterfly valve in accordance with the present invention is achieved utilizing fluid actuating apparatus operated by the fluid in the fluid line being controlled. This operation is schematically illustrated in FIGS. 6A and 6B wherein the butterfly valve member E of the type illustrated in FIGS. 1–5 in a fluid line B is controlled by lever depressing and lever rotating fluid operating cylinders 108 and 109 respectively.

The lever depressing fluid cylinder 108 includes a connecting rod 111 which upon actuation rotates the lever arm 91 about pin 93 (see FIG. 1) to depress the lever arm 91 thereby to permit rotation. The piston 112 connected to rod 111 is biased against movement of the rod 111 via a spring 113, and the fluid chamber of piston 108 is connected by a fluid line 114 to one port 115 of a three port three-way solenoid valve 116.

The lever rotating fluid cylinder 109 includes a connecting rod 121 joined at one end to the lever arm 91 for rotation of shaft section 43 and at the other end to fluid piston 122 which is biased by return spring 123. The fluid chamber of cylinder 109 is connected via fluid line 124 to the port 115 of valve 116. To insure that the butterfly valve is not rotated with the sealing member pressurized thereagainst the bias spring 123 of rotating cylinder 109 is stronger than bias spring 113 of depressing cylinder 108 whereby upon opening as described in detail below depressing cylinder 108 will operate first to relieve sealing pressure, and upon closing lever rotating cylinder 109 will operate first to close the butterfly valve before the seal is pressurized.

A second port 117 of the valve 116 is connected to the fluid line B and a third port 118 is connected to a reservoir 119. This reservoir is vented to atmosphere via an aperture 125 and communicates through a check valve 126 and fluid line 127 to a venturi 128 located in the fluid line B downstream of the valve member E.

Operation of the fluid cylinders 108 and 109 for opening and closing the butterfly valve is accomplished with fluid from the fluid line B utilizing the solenoid valve 116 in which the three positions are: (a) all ports closed, (b) port 115 connected to port 117 for opening the butterfly valve as shown in FIG. 6A and (c) port 115 connected to port 118 for closing the butterfly valve as shown in FIG. 6B. This operation is accomplished as follows: with the valve in closed position as indicated in 6A the three-way solenoid valve 116 is switched from no communication position to connect ports 117 and 115 whereby fluid pressure from line B first moves piston 112 in cylinder 108 to depress the butterfly valve actuating lever 91 and then moves piston 122 in valve 109 to rotate the lever 91 to desired open position. The solenoid valve 116 can be maintained in this operative condition until the butterfly valve completely opens or for a specified length of time dependent upon the characteristics of the system to open the valve to positions intermediate closed and open positions. At least in the case of movement of the valve to partially open position the solenoid valve is then returned to no communication position.

In order to close the butterfly valve E from an open position (not shown) to the closed position illustrated in FIG. 5B solenoid valve 116 is switched to provide communication between ports 115 and 118. In this arrangement fluid under pressure from the bias springs in the fluid cylinders 108 and 109 flows into reservoir 119 and due to a certain amount of fluid flowing in line B through the venturi 128 a certain amount of this fluid will be drawn through the check valve 126 into the line. Due to the higher strength of spring 123 the lever rotating mechanism will operate first to close the butterfly valve and then lever depressing cylinder 108 will operate to release the lever 91 to the position illustrated in FIG. 1 so that fluid in the line will establish the seal between the sealing member 26 and the periphery of the valve member E. As the butterfly valve is closing pressure in the line 127 due to flow through the venturi 128 will decrease so that a certain amount of fluid will collect in reservoir 119. This fluid will remain in the reservoir 119 until the butterfly valve is opened by operation of solenoid valve 116 in the position indicated in FIG. 6A at which time the remaining fluid in reservoir 119 will be drained.

An added advantage of a butterfly valve constructed in accordance with the present invention is the fact that since a certain amount of fluid is passed into the chamber behind the sealing member after the valve has been closed the valve can be quickly closed without shock. When filling a container to a marker it is desirable to be able to close the valve as fast as possible when reaching the marker to minimize the afterflow. A series of tests were run on a 4 inch butterfly valve constructed as illustrated to demonstrate shock characteristics in the operation of the valve.

The test equipment included a 4 inch valve constructed as shown in the drawings and connected in a 4 inch line approximately 40 feet long through which water was driven as a test medium by a gasoline driven engine pump. The valve was installed between standard tank truck flanges with a sight flow indicator downstream of the valve for visually checking the valve performance.

TEST NO. 1

With a fluid flow of approximately 450 gallons per minute the valve was operated from full open to full closed in about .2 second with no appreciable shock.

TEST NO. 2

With a fluid flow of approximately 600 gallons per minute the valve was operated from full open to ¾ closed in about .3 second with no shock and from ¾ closed to full closed in about .1 second with no shock.

TEST NO. 3

With a fluid flow of approximately 600 gallons per minute the valve was operated from full open to full closed in about .4 second with no shock.

TEST NO. 4

With a fluid flow of approximately 1,000 gallons per minute the valve was operated from full open to ¾ closed to full closed in about .1 second with no shock.

TEST NO. 5

With a fluid flow of approximately 1,000 gallons per minute the valve was operated from full open to full closed in about 1 second with no appreciable shock.

Obviously certain changes can be made in the construction of the butterfly valve in accordance with the persent invention without departing from the scope thereof. For example, instead of utilizing a solid seal member, an inflatable sealing member can be utilized wherein the pressure applying fluid is directed into the inflatable sealing member. Also, in this regard the sealing member can be provided on the butterfly valve member instead of located in an annular recess in the wall of the valve housing. With a valve constructed as last aforementioned the passageways providing communication between the upstream and downstream sides of the valve member and one side of the sealing membrane can be provided internally of the valve member and operated by a valve stem actuating lever in much the same manner as illustrated and described above.

Although the foregoing invention has been described in some detail by way of illustration and example for purpose of clarity of understanding, it is understood that certain charges and modifications may be practiced within the spirit of the invention as limited only by the scope of the appended claims.

What is claimed is:

1. Valve apparatus comprising, in combination, a housing having a main fluid passage; a substantially annular recess in the wall of said passage; a butterfly valve member; means for mounting said member in said passage for movement between an open position wherein fluid in said passage may flow past said member and a closed position wherein said member divides said passage into an upstream chamber and a downstream chamber, in said closed position the periphery of said member overlaying said recess; and annular sealing means mounted in said recess for movement of the inner surface into engagement with the periphery of said member responsive to pressure applied to the radially outward surface of said sealing means, said sealing means having a substantial radial thickness; a first fluid passageway providing communication between said upstream chamber and said radially outward surface of said sealing means for directing fluid pressure against said sealing means to urge said sealing means into sealing engagement with the periphery of said member; a second fluid passageway providing communication between said downstream chamber and said outward surface of said sealing means for relieving pressure against said surface of said sealing means; and means for closing said first passageway while said second passageway is open and means for closing said second passageway while said first passageway is open.

2. Valve apparatus comprising in combination a housing defining a main fluid passage; a substantially annular recess in the wall of said passage; a butterfly valve member; means for mounting said butterfly valve member in said passage for movement between an open position wherein flow of fluid past the member is permitted and a closed position wherein said valve divides said chamber into an upstream chamber and a downstream chamber, in said closed position the periphery of said member overlying said recess, said mounting means including a shaft section secured to said valve member and rotatably mounted in said housing; and annular sealing member mounted in said recess and located between the periphery of said valve member and said housing when said valve member is in closed position for movement of the radially inner surface of said sealing member into engagement with the periphery of said valve member responsive to pressure applied to the radially outward surface of said sealing member, said sealing means having a substantial radial thickness; a first fluid passageway through said shaft section providing communication between said upstream chamber and said outward surface of said sealing member for directing fluid pressure against said sealing member to urge said sealing member into sealing position; a second fluid passageway providing communication between said downstream chamber and said outward surface of said sealing member for relieving pressure against said portion of said sealing member; a valve stem located in said shaft section for closing said first passageway when said second passageway is open and for closing said second passageway when said first passageway is open; means for moving said butterfly valve member to open position only when said valve stem closes said first passageway.

3. The valve apparatus in accordance with claim 2, wherein said means for moving said valve member includes a lever rotatable for engagement with and movement of said valve stem and secured to said shaft section for rotation of said valve member.

4. The valve apparatus in accordance with claim 2, including operating means for moving said valve stem and said means for moving said valve member including a first fluid cylinder operable with fluid from said main fluid passage for moving said valve stem; a second fluid cylinder operable with fluid from said main fluid passage for moving said butterfly valve member; and means for actuating said first and second fluid cylinders with fluid from said main fluid passage to move said valve member only when said valve stem closes said first passageway.

References Cited

UNITED STATES PATENTS

| | | | |
|---|---|---|---|
| 1,671,069 | 5/1928 | DeWein | 251—305 X |
| 1,834,870 | 12/1931 | Rogers | 251—173 |
| 2,567,032 | 9/1951 | Schmidt | 251—175 X |
| 2,939,674 | 6/1960 | Anderson | 251—173 |
| 3,007,490 | 11/1961 | Passmore | 251—159 X |

CLARENCE R. GORDON, *Primary Examiner.*